(12) United States Patent
Imahori et al.

(10) Patent No.: US 8,901,427 B2
(45) Date of Patent: Dec. 2, 2014

(54) WIRE HOLDING DEVICE AND WIRE HARNESS

(71) Applicant: Hitachi Metals, Ltd., Tokyo (JP)

(72) Inventors: Masaaki Imahori, Hitachinaka (JP); Takahiro Futatsumori, Hitachi (JP)

(73) Assignee: Hitachi Metals, Ltd., Tokyo (JP)

(*) Notice: Subject to any disclaimer, the term of this patent is extended or adjusted under 35 U.S.C. 154(b) by 0 days.

(21) Appl. No.: 13/947,832

(22) Filed: Jul. 22, 2013

(65) Prior Publication Data
US 2014/0027154 A1    Jan. 30, 2014

(30) Foreign Application Priority Data

Jul. 24, 2012    (JP) .................................. 2012-164095

(51) Int. Cl.
| | |
|---|---|
| *H01B 9/00* | (2006.01) |
| *H02G 15/08* | (2006.01) |
| *H02G 3/08* | (2006.01) |
| *H02G 15/013* | (2006.01) |
| *H02G 3/06* | (2006.01) |

(52) U.S. Cl.
CPC ............... *H01B 9/006* (2013.01); *H02G 3/088* (2013.01); *H02G 3/0675* (2013.01); *H02G 15/013* (2013.01); *H02G 3/0658* (2013.01)
USPC ....... 174/135; 174/72 A; 174/68.1; 174/72 R; 174/155; 439/449

(58) Field of Classification Search
USPC ........ 174/72 A, 77 R, 151, 152 R, 68.1, 68.3, 174/72 R, 88 R, 91, 70 C, 155, 156, 154; 385/134, 135; 439/271, 272, 519, 556, 439/587, 449, 455, 607.41
See application file for complete search history.

(56) References Cited

U.S. PATENT DOCUMENTS

| | | | | |
|---|---|---|---|---|
| 5,696,351 | A | * | 12/1997 | Benn et al. .................. 174/77 R |
| 5,831,815 | A | * | 11/1998 | Miller et al. .................. 439/455 |
| 6,354,878 | B1 | * | 3/2002 | Kropa et al. ............. 439/607.41 |
| 6,595,789 | B2 | | 7/2003 | Oota et al. |
| 6,814,617 | B2 | | 11/2004 | Oota et al. |
| 7,278,876 | B2 | * | 10/2007 | Hara et al. .................... 439/455 |
| 7,507,121 | B1 | * | 3/2009 | Scea et al. ................ 439/607.41 |
| 7,692,095 | B2 | * | 4/2010 | Katsumata et al. ......... 174/72 A |

FOREIGN PATENT DOCUMENTS

| | | |
|---|---|---|
| JP | 2002-134953 | 5/2002 |
| JP | 2007-287464 | 11/2007 |

* cited by examiner

*Primary Examiner* — Angel R Estrada
(74) *Attorney, Agent, or Firm* — Roberts Mlotkowski Safran & Cole P.C.

(57) ABSTRACT

A wire holding device includes a pair of holding members to enclose an electric wire therebetween when the pair of holding members are coupled. The pair of holding members each include an arcuate holding groove to hold the electric wire on an inside surface thereof. An inner surface of the holding groove to contact with an outer peripheral surface of the electric wire is surface-roughened. A surface roughness Ra of the inner surface of the holding groove is greater than that of the outer peripheral surface of the electric wire.

8 Claims, 5 Drawing Sheets

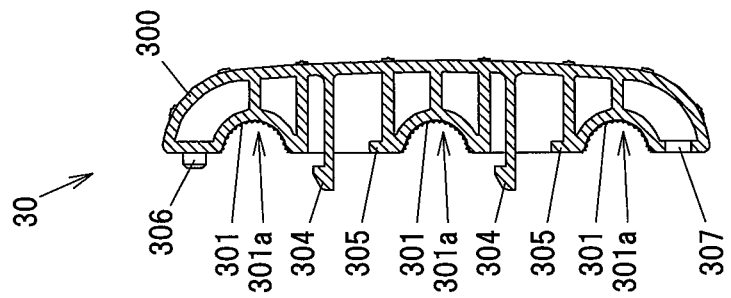
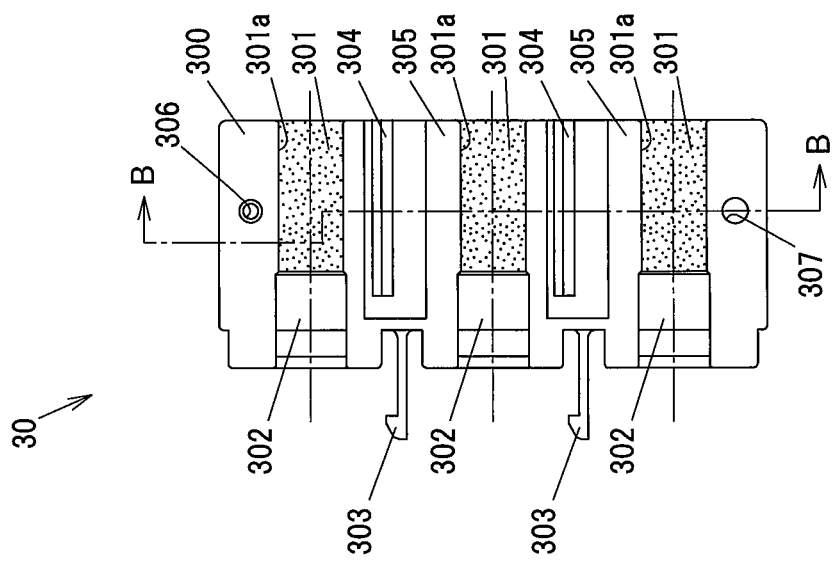

WIRE HOLDING DEVICE AND WIRE HARNESS

The present application is based on Japanese patent application No. 2012-164095 filed on Jul. 24, 2012, the entire contents of which are incorporated herein by reference.

BACKGROUND OF THE INVENTION

1. Field of the Invention

The invention relates to a wire holding device for holding an electric wire and to a wire harness provided with the wire holding device and the electric wire.

2. Description of the Related Art

In a conventional wire holding device for holding an electric wire, a holding hole is formed by arranging a pair of holding grooves so as to face each other and an electric wire is inserted into and held by the holding hold (see, e.g., JP-A-2002-134953 and JP-A-2007-287464).

A wire holder disclosed in JP-A-2002-134953 is housed, together with electric wires, in a shield case having a shield structure and is composed of an upper holder and a lower holder. Then, the electric wires are fixed by joining the pair of holders. Rubber tubular waterproof plugs for preventing water from entering an electronic unit are provided between outer peripheral surfaces of the electric wires and an inner peripheral surface of the wire holder. The waterproof plugs are held all together from the outside by the wire holder and are fixed to the electric wires. Accordingly, it is possible to fix the waterproof plugs to the electric wires by simple work.

In a wire holding device disclosed in JP-A-2007-287464, a cavity having a circular cross section is formed inside a connector housing so as to penetrate in a front-back direction. A cylindrical waterproof packing is provided on an outer periphery of an electric wire to make watertight between the outer peripheral surface of the electric wire and the inner surface of the cavity. In addition, a wire holder for holding the electric wire is housed in a rear end portion of the connector housing. Plural protrusions digging into an insulation-covered portion of the wire are formed on an inner wall of the wire holder, rotation of the electric wire is suppressed by the protrusions even when a rotational force is generated in the electric wire and it is thus possible to stably hold the electric wire.

SUMMARY OF THE INVENTION

The wire holder disclosed in JP-A-2002-134953 has a problem that a force of holding the electric wire may be insufficient.

The wire holding device disclosed in JP-A-2007-287464 has a greater force of holding the electric wire than the wire holder disclosed in JP-A-2002-134953. However, since the protrusions formed on the inner wall of the wire holder dig into the insulation-covered portion of the electric wire, cracks originating from such dug portions may occur.

It is an object of the invention to provide a wire holding device and a wire harness which allow a wire holding force to be improved without providing protrusions which may cause cracks on an insulation-covered portion.

(1) According to one embodiment of the invention, a wire holding device comprises:

a pair of holding members to enclose an electric wire therebetween when the pair of holding members are coupled, wherein the pair of holding members each comprise an arcuate holding groove to hold the electric wire on an inside surface thereof, wherein an inner surface of the holding groove to contact with an outer peripheral surface of the electric wire is surface-roughened, and wherein a surface roughness Ra of the inner surface of the holding groove is greater than that of the outer peripheral surface of the electric wire.

In the above embodiment (1) of the invention, the following modifications and changes can be made.

(i) A length of the holding groove in a longitudinal direction of the enclosed electric wire is not less than 1 cm, and wherein the surface roughness Ra of the inner surface of the holding groove is not less than 6

(ii) The pair of holding members are configured so as to compress the electric wire by the inner surface of the holding groove when the pair of holding members are coupled, and wherein an amount of compression in the compressed electric wire is not less than 0.1 mm.

(iii) The pair of holding members further comprise a locking mechanism so as to be coupled to each other.

(iv) The pair of holding members further comprise a tubular portion connecting with the holding groove on the inside surface thereof, and wherein the tubular portion has an inside diameter greater than an outside diameter of the housed electric wire when the pair of holding members are coupled.

(v) The tubular portion is formed closer to a terminal of the electric wire than the holding groove when the electric wire is enclosed between the pair of holding members.

(2) According to another embodiment of the invention, a wire harness comprises:

the wire holding device according to the above embodiment (1); and the electric wire.

In the above embodiment (2) of the invention, the following modifications and changes can be made.

(vi) The electric wire comprises a plurality of electric wires, wherein the holding groove comprises a plurality of holding grooves corresponding to the plurality of electric wires, and wherein the plurality of electric wires are each housed in corresponding one of the plurality of holding grooves formed on each of the pair of holding members so as to be collectively held.

Points of the Invention

According to one embodiment of the invention, a wire holding device is constructed such that it is composed of a pair of holding members to enclose an electric wire therebetween when the holding members are coupled, and the inner surface of a holding groove formed on an inside surface of the coupled pair of holding members is surface-roughened. This allows the wire holding force to be improved without providing protrusions potentially causing cracks on the insulation-covered portion.

BRIEF DESCRIPTION OF THE DRAWINGS

Next, the present invention will be explained in more detail in conjunction with appended drawings, wherein:

FIGS. 2A and 2B show cross sections of the wire harness, wherein FIG. 2A is a cross sectional view taken along a running direction of an electric wire and FIG. 2B is a cross sectional view taken on line A-A of FIG. 1;

FIGS. 3A and 3B show a structure of a holding member, wherein FIG. 3A is a front view and FIG. 3B is a cross sectional view taken on line B-B of FIG. 3A;

DETAILED DESCRIPTION OF THE PREFERRED EMBODIMENTS

Embodiment

Figure 1:
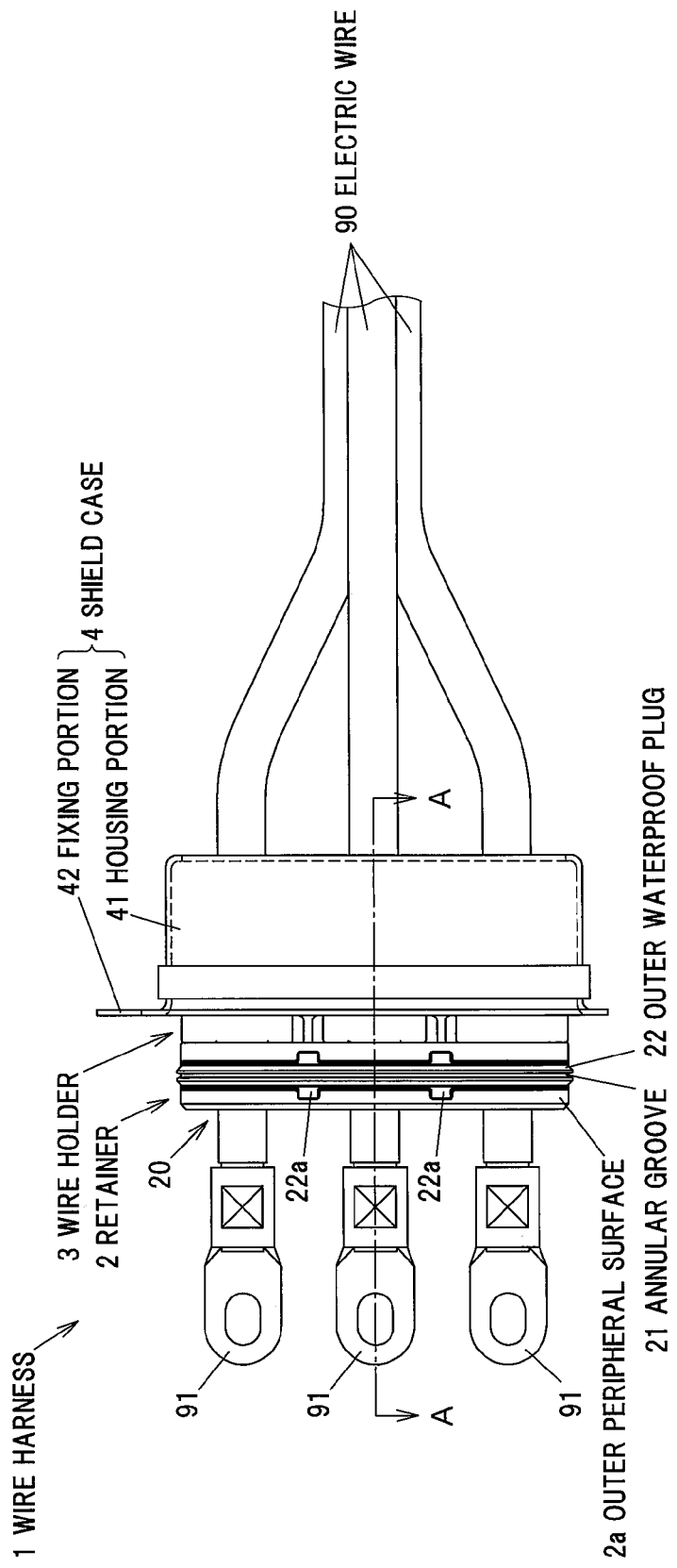
FIG. 1 is a front view showing a wire holder and a wire harness in an embodiment of the present invention.

FIG. 1 is a front view showing a wire holder 3 and a wire harness 1 in the embodiment of the invention.

The wire harness 1 is provided with a retainer 2 as a seal holding member, a wire holder 3 as a wire holding device and a shield case 4 as a housing member. The retainer 2 has three insertion holes 20 for inserting three electric wires 90 each composed of a conductor portion 901 and an insulation-covered portion 90, the wire holder 3 is a separate component from the retainer and holds the three electric wires 90, and the shield case 4 houses a portion of the holder 3.

The retainer 2 and the wire holder 3 face each other in a running direction of the three electric wires 90. In addition, an annular groove 21 is formed on an outer peripheral surface 2a of the retainer 2 and an outer waterproof plug 22 as an outer periphery sealing member is held in the annular groove 21. Plural protrusions 22a protruding in a direction orthogonal to an extending direction of the outer waterproof plug 22 are formed on the outer waterproof plug 22. A terminal 91 is provided on each of the three electric wires 90 at an end portion exposed to the outside from the retainer 2.

The retainer 2 and the wire holder 3 are formed of a resin having electrical insulating properties such as PBT (polybutylene terephthalate), PA (polyamide) or PPS (polyphenylene sulfide), and are formed by, e.g., injection molding.

The shield case 4 is formed of a conductive metal such as iron, brass or aluminum, and integrally has a housing portion 41 for housing at least a portion of the wire holder 3 and a plate-shaped fixing portion 42 for fixing the shield case 4 to an attachment target.

Figure 2A:
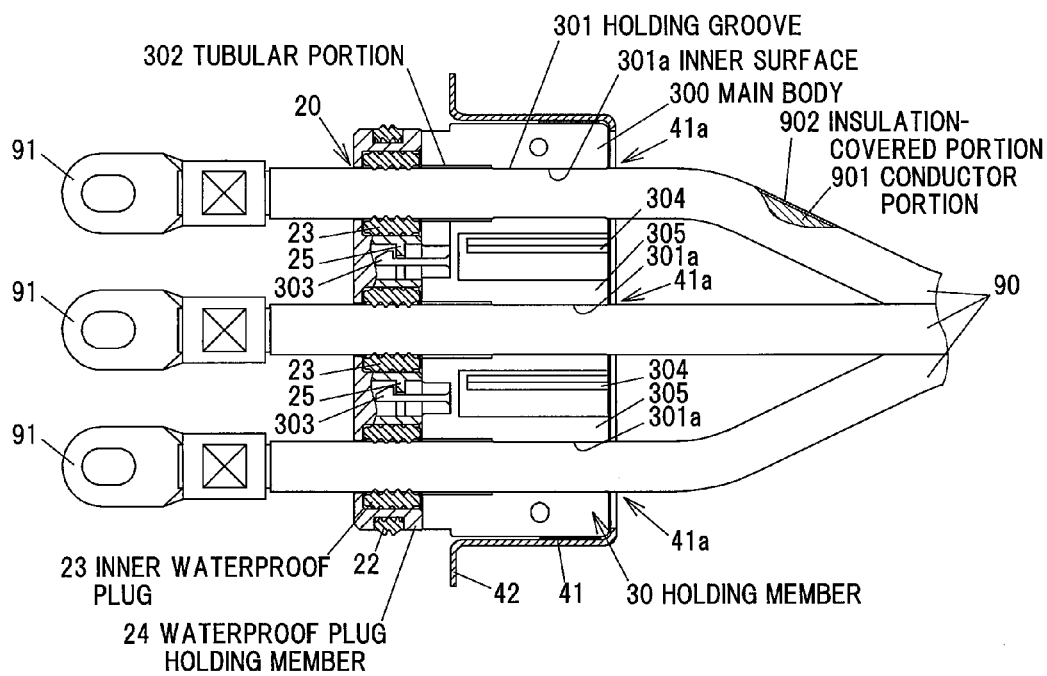
Figure 2B:
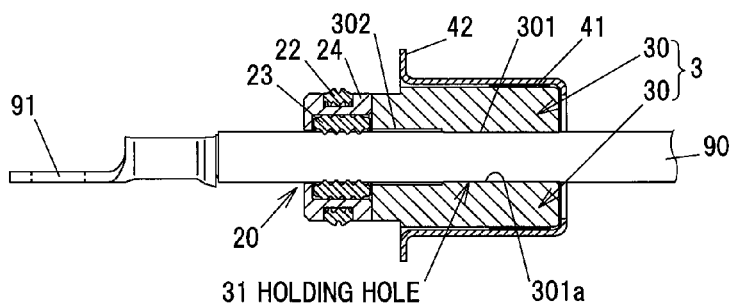

FIGS. 2A and 2B show cross sections of the wire harness 1, wherein FIG. 2A is a cross sectional view taken along the running direction of the electric wire 90 and FIG. 2B is a cross sectional view taken on line A-A of FIG. 1.

On the housing portion 41 of the shield case 4, openings 41a for inserting the three electric wires 90 are formed on a surface opposite to the retainer 2. The three electric wires 90 are inserted into the shield case 4 through the openings 41a, pass through holding holes 31 of the blow-described wire holder 3 and the insertion holes 20 of the retainer 2, and are then exposed to the outside of the retainer 2.

The wire holder 3 is composed of a pair of holding members 30 which face each other with the three electric wires 90 interposed therebetween, and each holding member 30 is locked and joined to each other. FIG. 2A only shows the holding member 30 located on the lower side in FIG. 2B. In the present embodiment, each holding member 30 is formed in the same shape.

In the holding member 30, plural (three in the present embodiment) holding grooves 301 and plural (three in the present embodiment) tubular portions 302 are formed on a main body 300. The holding groove 301 is formed in an arcuate shape in cross section so as to extend in the running direction of the electric wire 90. By joining the pair of holding members 30, inner surfaces 301a of the three holding grooves 301 of the respective holding members 30 are arranged at positions facing each other and three holding holes 31 for respectively housing the three electric wires 90 are thereby formed. Then, the three electric wires 90 are held all together by the pair of holding members 30.

In addition, on the holding member 30, two claw portions 303 to be locked to the retainer 2 are integrally formed with the main body 300.

The retainer 2 is arranged on the terminal 91 side with respect to the wire holder 3 along the running direction of the three electric wires 90.

Inner waterproof plugs 23 as cylindrical inner periphery sealing members are respectively held between inner peripheral surfaces of the three insertion holes 20 and the three electric wires 90. In addition, a waterproof plug holding member 24 is interposed between the inner waterproof plugs 23 and the outer waterproof plug 22 to hold the inner waterproof plugs 23 and the outer waterproof plug 22.

In addition, on the retainer 2, two locking portions 25 for respectively locking the two claw portions 303 of the wire holder 3 are formed respectively between two adjacent insertion holes 20. The claw portions 303 and the locking portions 25 form a locking mechanism for locking the retainer 2 to the wire holder 3. The claw portion 303 has elasticity, and accordingly, the retainer 2 and the wire holder 3 are relatively movable in a circumferential direction of the electric wire 90 even in a state of being coupled to each other by the claw portions 303 and the locking portions 25. In other words, even if the shield case 4 and the wire holder 3 rotate in a rotational direction of a bolt at the time of securing the fixing portion 42 of the shield case 4 to an outer surface of an attachment target by the bolt after inserting the retainer 2 into an attachment hole formed on the attachment target, change in position of the retainer 2 in the attachment hole is suppressed by relative movement between the retainer 2 and the wire holder 3.

FIGS. 3A and 3B show a structure of the holding member 30, wherein FIG. 3A is a front view and FIG. 3B is a cross sectional view taken on line B-B of FIG. 3A.

In each of the three holding grooves 301, the inner surface 301a is textured so that the surface roughness Ra thereof is greater than that of the outer peripheral surfaces of the three electric wires 90, e.g., is not less than 6 μm and not more than 100 μm. For example, a mold of which surface corresponding to the inner surface 301a is roughened is used for forming the holding member 30, and the inner surface 301a thereby can be textured.

In addition, length of the holding groove 301 in the running direction of the electric wire 90 is desirably about 1 to 3 cm. This is because a good wire holding force may not be obtained when the length is less than 1 cm, and the size of the wire holder 3 is increased (the length of the holding groove 301 in the running direction of the electric wire 90 is increased) when the length is more than 3 cm.

The tubular portion 302 is formed in an arcuate shape having an inner diameter larger than a diameter (e.g., 8.6 mm) of each of the three electric wires 90. Accordingly, there are gaps between the wire holder 3 and the three electric wires 90 in the tubular portions 302. This allows the electric wires 90 to be bent in the tubular portions 302 when the retainer 2 and the wire holder 3 relatively move, which allows smooth relative movement between the retainer 2 and the wire holder 3. Note that, the gaps are exaggeratingly shown in FIGS. 2A and 2B for the purpose of explanation.

On each holding member 30, two coupling hooks 304 and two locking portions 305 are formed as a locking mechanism for coupling the holding members 30 to each other. In addition, a fitting protrusion 306 and a fitting recess 307 are formed on the main body 300 to determine relative positions of the respective holding members 30.

The coupling hook 304 is engaged with the locking portion 305 formed on the other holding member 30. In addition, the coupling hook 304 formed on the other holding member 30 is engaged with the locking portion 305. Furthermore, the fitting protrusion 306 is fitted to the fitting recess 307 formed on the other holding member 30 and the fitting protrusion 306 formed on the other holding member 30 is fitted to the fitting recess 307.

By coupling a pair of holding members 30, the three electric wires 90 are sandwiched between the holding grooves 301 on one side and the holding grooves 301 on the other side and thus are held by the wire holder 3.

Figure 4A:
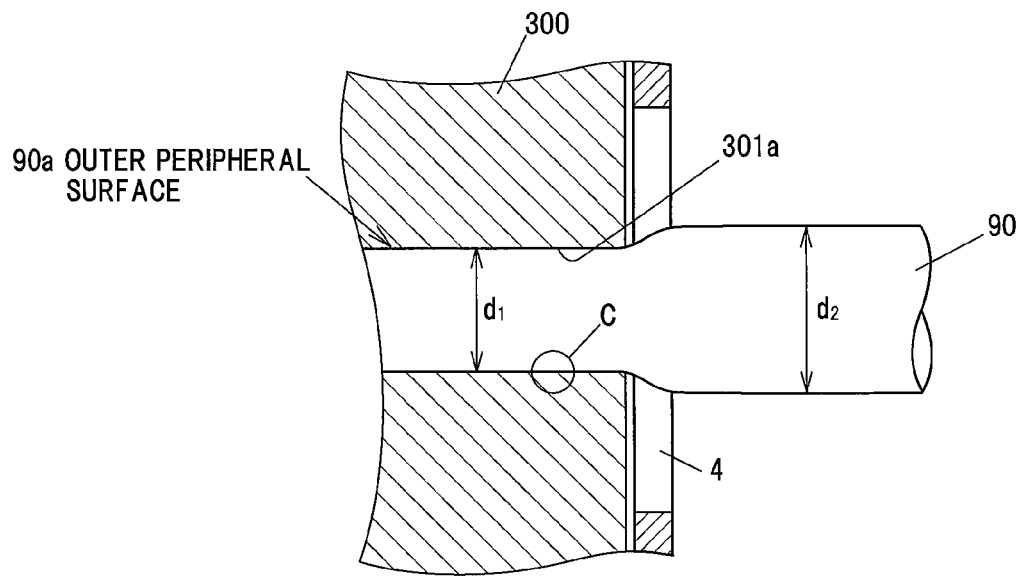
FIG. 4A is a partial enlarged view of FIG. 2B
Figure 4B:
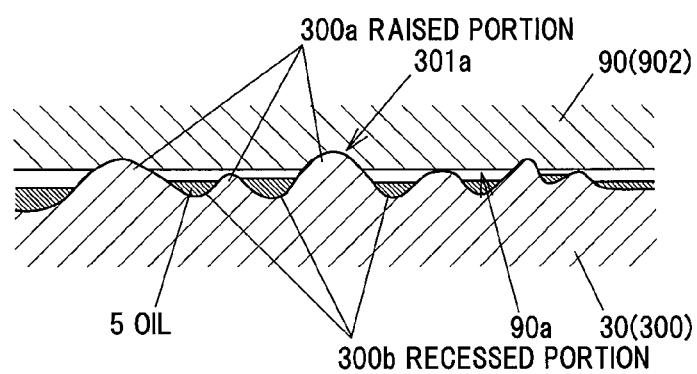
FIG. 4B is an enlarged schematic view showing a portion C in FIG. 4A.

FIG. 4A is a partial enlarged view of FIG. 2B and FIG. 4B is an enlarged schematic view showing a portion C in FIG. 4A.

The pair of holding members 30 compress the electric wires 90 such that the inner surfaces 301a of the holding grooves 301 press the outer peripheral surfaces 90a of the electric wires 90. A compression range Δd thereof is expressed by $d_2 - d_1$ and is, e.g., not less than 0.1 mm. In addition, as shown in FIG. 4B, fine raised portions 300a and fine recessed portions 300b are formed on the inner surfaces 301a of the holding grooves 301 by surface-roughening and an oil 5 is collected in the recessed portions 300b.

Method of Assembling Wire Harness 1

For assembling the wire harness 1, steps of "attachment of the inner waterproof plug 23", "attachment of the retainer 2", "attachment of the wire holder 3", "attachment of the shield case 4" and "coupling of the retainer 2 to the wire holder 3" are performed in this order. An example of each step will be described below.

"Attachment of Inner Waterproof Plug 23"

The tip portions of the three electric wires 90 are respectively inserted through the inner waterproof plugs 23 to attach the inner waterproof plugs 23 on the outer peripheries of the three electric wires 90. At this time, the oil 5 (e.g., silicon oil or grease, etc.) is applied to the outer peripheral surfaces 90a of the three electric wires 90 so that the inner waterproof plugs 23 slide smoothly.

"Attachment of Retainer 2"

Next, the retainer 2 with the outer waterproof plug 22 already held in the annular groove 21 is attached from the tip portion side of the three electric wires 90 so that the three electric wires 90 are respectively inserted into the insertion holes 20 of the retainer 2. After attaching the retainer 2, the terminals 91 are crimped to the respective tip portions of the three electric wires 90.

"Attachment of Wire Holder 3"

Next, the wire holder 3 is attached so that the inner waterproof plugs 23 are sandwiched between the retainer 2 and the wire holder 3. The wire holder 3 is attached by coupling the pair of holding members 30 so as to sandwich the three electric wires 90 therebetween.

"Attachment of Shield Case 4"

Next, the wire holder 3 is press-fitted to the housing portion 41 of the shield case 4 in which the three electric wires 90 are preliminarily inserted through the openings 41a before attaching the inner waterproof plugs 23. Accordingly, the wire holder 3 is attached to the shield case 4.

"Coupling of Retainer 2 to Wire Holder 3"

Next, the retainer 2 and the wire holder 3 are brought close to each other in a state that the inner waterproof plugs 23 are housed in the insertion holes 20 of the retainer 2 and the claw portions 303 of the wire holder 3 are locked to the locking portions 25 of the retainer 2. Accordingly, the retainer 2 is coupled to the wire holder 3.

In the meantime, oil, etc., such as silicon oil or grease is sometimes applied in order to lubricate between the inner waterproof plugs 23 and the electric wires 90 when the inner waterproof plugs 23 for preventing water from entering a connector are assembled to the electric wires 90. When a liquid such as oil is adhered to the electric wire 90, a force of holding the electric wire 90 may decrease since a surface of the electric wire 90 becomes slippery but the present embodiment achieves an effect of suppressing the decrease in the holding force. This will be described below.

Figure 5:
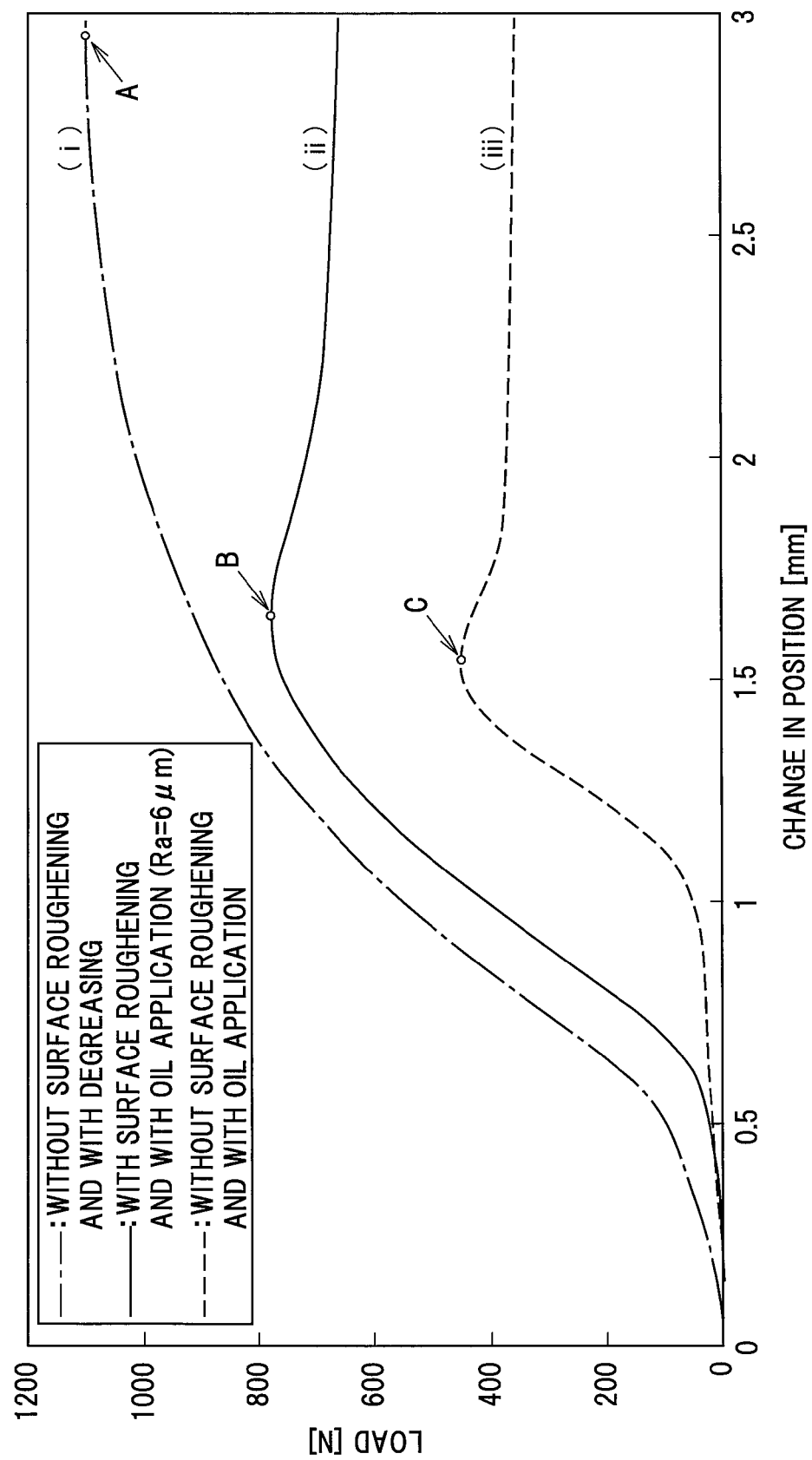
FIG. 5 is a graph showing a relation between a change in position of the electric wire and a load when pulling the electric wire at a constant speed.

FIG. 5 is a graph showing a relation between a change in position of the electric wire 90 and a load when pulling the electric wire 90 at a constant speed in order to confirm an effect of surface-roughening (texturing) the inner surface 301a of the holding groove 301.

In this test, a test piece of the wire holder 3 was made, the electric wire 90 held in the test piece was pulled at a constant speed (at 100 mm/minute in the present test) and a change in position of the electric wire 90 and a load applied to the electric wire 90 were measured.

In the graph, (i) shows a test result when the outer peripheral surface 90a of the electric wire 90 is degreased and the inner surface 301a of the holding groove 301 of the test piece is not surface-roughened. And, (ii) shows a test result when oil is applied to the outer peripheral surface 90a of the electric wire 90 and the inner surface 301a of the holding groove 301 of the test piece is surface-roughened (the surface roughness Ra=6 μm, length of the holding groove 301 in the running direction of the electric wire 90=2 cm). Then, (iii) shows a test result when oil is applied to the outer peripheral surface 90a of the electric wire 90 and the inner surface 301a of the holding groove 301 of the test piece is not surface-roughened.

The peak value A of the graph (i) is 1100 [N], the peak value B of the graph (ii) is 780 [N] and the peak value C of the graph (iii) is 450 [N].

In comparison between the graphs (i) and (iii) in both of which the inner surface 301a of the holding groove 301 is not surface-roughened, whereas the peak value A of the load of the graph (i) when degreasing the outer peripheral surface 90a of the electric wire 90 is 1100 [N], the peak value C of the load of the graph (iii) when applying the oil to the outer peripheral surface 90a of the electric wire 90 is 450 [N]. After the peak value C, the change in position continues to increase at around 380 [N] of load. This shows that the force of holding the electric wire 90 decreases when the oil is applied to the outer peripheral surface 90a of the electric wire 90.

Next, in comparison between the graphs (ii) and (iii) in both of which the oil is applied to the outer peripheral surface 90a of the electric wire 90, whereas the peak value C of the load of the graph (iii) when not surface-roughening the inner surface 301a of the holding groove 301 is 450[N], the peak value B of the load of the graph (ii) when surface-roughening the inner surface 301a of the holding groove 301 is increased to 780 [N]. This means that it is possible to suppress a decrease in the load by surface-roughening the inner surface 301a of the holding groove 301. It is considered that this is because the oil 5 adhered to the raised portions 300a flows into the recessed portions 300b as shown in FIG. 4B by pressing the inner surface 301a of the holding groove 301 against the outer peripheral surface 90a of the electric wire 90 and the raised portions 300a on the inner surface 301a of the holding groove 301 come directly into contact with the outer peripheral surface 90a of the electric wire 90. Note that, the same effect as described above is obtained as long as the surface roughness Ra is not less than 6 μm and not more than 100 μm and the length of the holding groove 301 in the running direction of the electric wire 90 is not less than 1 cm and not more than 3 cm.

Functions and Effects of the Embodiment

The following functions and effects are obtained in the embodiment.

(1) The three electric wires 90 are held in the wire holder 3 by placing the pair of holding members 30 so as to face each other and the inner surface 301a of the holding groove 301 which is surface-roughened allows the wire holding force to be improved without providing protrusions potentially causing cracks on the insulation-covered portion. In other words, since the fine raised portions 300a on the inner surface 301a of the holding groove 301 do not dig into the insulation-covered portion 902 to the extent of causing cracks on the insulation-covered portion 902 of the electric wire 90, cracks originating from the raised portions 300a are less likely to occur on the insulation-covered portion 902 even when the electric wire 90 is pulled. Furthermore, a frictional force due to the raised portions 300a allows the force of holding the electric wire 90 to be improved.

(2) By making the surface roughness Ra of the inner surface 301a of the holding groove 301 greater than that of the outer peripheral surface 90a of the electric wire 90, the oil 5 present between the outer peripheral surface 90a of the electric wire 90 and the inner surface 301a of the holding groove 301 is collected in the recessed portions 300b. Therefore, the raised portions 300a come directly into contact with the outer peripheral surface 90a of the electric wire 90 and the decrease in the force of holding the electric wire 90 is thus suppressed.

(3) Even when the oil is applied to the electric wires 90, the decrease in the force of holding the three electric wires 90 due to oil application is suppressed, as shown in the test results.

(4) The force of holding the electric wire 90 is further improved when the length of the holding groove 301 in the running direction of the electric wire 90 is not less than 1 cm and the surface roughness Ra of the inner surface 301a of the holding groove 301 is not less than 6 μm.

(5) Since the compression range Δd of the electric wire 90 is not less than 0.1 mm, the electric wire 90 is compressed by the holding members 30 with an appropriate force and the decrease in the force of holding the electric wire 90 is further improved.

(6) The coupling hooks 304 and the locking portions 305 as a locking mechanism are formed on the pair of holding members 30 to promote appropriate compression of the electric wire 90.

(7) A mold of which surface corresponding to the inner surface 301a is roughened is used for forming the holding member 30, thereby surface-roughening (texturing) the inner surface 301a of the holding groove 301. Therefore, a surface-roughening process to increase surface roughness of the inner surface 301a is not required after forming the holding member 30. As a result, it is possible to reduce manufacturing costs and manufacturing time as compared to the case of surface-roughening the holding member 30.

Although the embodiment of the invention has been described, the invention according to claims is not to be limited to the above-mentioned embodiment. Further, please note that all combinations of the features described in the embodiment are not necessary to solve the problem of the invention.

For example, the retainer 2 and the wire holder 3 may not be locked to each other in the embodiment.

In addition, the inner waterproof plug 23 may not be held on the inner peripheral side of the retainer 2 and may be held in the tubular portion 302 of the holding member 30.

In addition, the number of the electric wires 90 held by the wire holder 3 is not limited and may be one, two or four.

In addition, the terminals 91 may not be crimped to the tip portions of the three electric wires 90.

Although the coupling hooks 304 and the locking portions 305 are formed on each of the pair of holding members 30, it may be configured such that the coupling hooks 304 are formed on one of the holding members 30 and the locking portions 305 are formed on another holding member 30.

The attachment target to which the wire harness 1 is attached is not specifically limited and the invention is applicable to a case, etc., of, e.g., a communication device or an information processor.

What is claimed is:

1. A wire holding device, comprising: a pair of holding members to enclose an electric wire therebetween when the pair of holding members are coupled, wherein the pair of holding members each comprise an arcuate holding groove to hold the electric wire on an inside surface thereof, wherein an inner surface of the holding groove to contact with an outer peripheral surface of the electric wire is surface-roughened, and wherein the inner surface of the holding groove is textured with irregular raised and recessed portions having a surface roughness Ra greater than that of the outer peripheral surface of the electric wire.

2. The wire holding device according to claim 1, wherein a length of the holding groove in a longitudinal direction of the enclosed electric wire is not less than 1 cm, and wherein the surface roughness Ra of the inner surface of the holding groove is not less than 6 μm.

3. The wire holding device according to claim 1, wherein the pair of holding members are configured so as to compress the electric wire by the inner surface of the holding groove when the pair of holding members are coupled, and wherein an amount of compression in the compressed electric wire is not less than 0.1 mm.

4. The wire holding device according to claim 1, wherein the pair of holding members further comprise a locking mechanism so as to be coupled to each other.

5. A wire harness, comprising: the wire holding device according to claim 1; and the electric wire.

6. The wire harness according to claim 5, wherein the electric wire comprises a plurality of electric wires, wherein the holding groove comprises a plurality of holding grooves corresponding to the plurality of electric wires, and wherein the plurality of electric wires are each housed in corresponding one of the plurality of holding grooves formed on each of the pair of holding members so as to be collectively held.

7. The wire holding device according to claim 1, wherein the pair of holding members further comprise a tubular portion connecting with the holding groove on the inside surface thereof, and wherein the tubular portion has an inside diameter greater than an outside diameter of the housed electric wire when the pair of holding members are coupled.

8. The wire holding device according to claim 7, wherein the tubular portion is formed closer to a terminal of the electric wire than the holding groove when the electric wire is enclosed between the pair of holding members.

* * * * *